United States Patent Office 2,890,141
Patented June 9, 1959

2,890,141

SOLDERING FLUX

Henry E. MacCormack, Chenango Bridge, N.Y., assignor to International Business Machines Corporation, New York, N.Y., a corporation of New York No Drawing. Application August 8, 1956
Serial No. 602,895

6 Claims. (Cl. 148—23)

This invention relates to an improved chemically pure soldering flux.

In the fabrication of metal articles in which union of parts is effected by soldering or the like, it is customary, prior to the soldering operation, to coat the parts to be joined with flux which has the ability to clean the surfaces of the parts of impurities, oxides, etc., which can interfere with the formation of a bond between the soldering parts. It is very important, particularly in the manufacture of electronic components and the like, to avoid a corrosive flux that can damage insulation or lead to eventual ionic salt growths that cause elusive short circuits, and to employ instead a non-corrosive flux.

An object of the invention resides in the provision of an improved non-corrosive and electrically non-conductive residual flux.

Another object resides in the provision of an improved residual flux which is impervious to atmospheres of high humidity.

Yet another object resides in the provision of a flux, the fumes and odors of which, arising during a soldering operation, are harmless and inoffensive to the worker.

Still another object resides in the provision of an improved flux containing a plasticizer which behaves also as a vigorous accelerator providing surfaces cleaner than have heretofore been possible by known fluxes.

The present invention is composed of a mixture of pure gum rosin and acetic acid, the proportion of the latter being from 0.1% to 10% by weight, which acid is free from all inorganic acids and salts and contains chlorides not to exceed 0.0025% by weight. The gum rosin is either water white grade or better and contains less than 0.05% chlorides by weight.

The glacial acetic acid serves not only as a plasticizer but also as a vigorous accelerator when catalyzed by heat above the melting point of the rosin. The boiling point of glacial acetic acid is 244° F. whereas the melting point of rosin covers a range of from 212° F. to 284° F. The boiling point of the glacial acetic acid falls well within the range of the melting point of the rosin, thus the acid vaporizes first to break down the rosin releasing from the latter organic corrosive molecules which act as deoxidizers. The vapors of the acid are extremely corrosive to metal surfaces since these vapors attack and thereby reduce the oxides on the metal surfaces to be soldered.

Continued activity of the vapors produces a very clean surface of the metal surfaces. Accompanying this activity is of course a wetting of the surfaces by the molten rosen which has a temperature of somewhere from 250° F. to 300° F., releasing hydrogen and carbon molecules.

A further rise in temperature of the rosin causes complete volatilization of the acid from the rosin and a more rapid breakdown of the rosin thereby releasing additional hydrogen and carbon molecules. The action continues until the temperature reaches a point where the applied alloy solder flows and molecularly fuses with the surfaces of the parts to form the soldered joint. The minimum temperature required to form a plastic stage of alloys of soft solders containing tin and lead is approximately 361° F. As the wetting process continues, the oxides not totally reduced become embedded and thus entrapped in the molten rosin residue as the molten solder fuses to the cleaned metal surfaces. The soldered joint contains no inorganic or organic chemicals capable of causing future corrosion to adjoining metallic surfaces or plastic coatings, nor will the hardened residual rosin support any kind of inonic salt growth or deliquesce in the presence of extremely humid atmospheres.

It is also desirable to have the soldering flux in liquid form. This may be compounded by dissolving the flux in a solvent such as butyl alcohol, methyl alcohol or isopropyl alcohol in the following proportions:

| Flux: | Percent by weight |
|---|---|
| Pure gum rosin | } 30 |
| Glacial acetic acid 0.1% to 10% | |
| Alcohol, chemically pure | 70 |

While there have been described and pointed out the fundamental novel features of the invention as applied to a preferred embodiment, it will be understood that various omissions and substitutions and changes in the composition described may be made by those skilled in the art, without departing from the spirit of the invention. It is the intention, therefore, to be limited only as indicated by the scope of the following claims.

What is claimed is:

1. A soldering flux consisting of rosin and glacial acetic acid, the latter being in the proportion of from 0.1% to 10% by weight of the flux.

2. A soldering flux consisting of pure gum rosin, glacial acetic acid in the proportions of from 0.1% to 10% by weight of the flux, and a relatively low boiling point solvent, said flux being substantially free of chemical compounds which cause ionic growth of metal, said glacial acetic acid being less by weight than the rosin, and the solvent being in such quantity as to render the flux substantially liquid in form.

3. A liquid soldering flux as in claim 2 in which said solvent is chemically pure alcohol.

4. A liquid soldering flux as in claim 3 in which the proportion of alcohol to the flux is approximately 70% by weight of the mixture.

5. A soldering flux consisting of rosin and an amount of acetic acid in substantially the proportions of 0.1% to 10% parts by weight of the flux.

6. A soldering flux consisting of substantially pure gum rosin and an amount of acetic acid in substantially the proportions of 0.1% to 10% parts by weight of the flux.

References Cited in the file of this patent

UNITED STATES PATENTS

| 1,724,680 | Ripley | Aug. 13, 1929 |
| 2,480,723 | Evans et al. | Aug. 30, 1949 |

FOREIGN PATENTS

| 20,858 | Australia | Dec. 13, 1929 |
| 105,339 | Australia | Sept. 28, 1938 |
| 494,906 | Great Britain | Nov. 3, 1948 |
| 508,729 | Canada | Jan. 4, 1955 |